J. J. CHALOUX.
GLASS TUBE GRINDING MACHINE.
APPLICATION FILED MAR. 12, 1910.

970,987.

Patented Sept. 20, 1910.

3 SHEETS—SHEET 3.

Witnesses
Thos. F. Knox.
C. Brodway

Inventor
John J. Chaloux.
By Victor J. Evans
Attorney

UNITED STATES PATENT OFFICE.

JOHN J. CHALOUX, OF WATERVLIET, NEW YORK.

GLASS-TUBE-GRINDING MACHINE.

970,987. Specification of Letters Patent. Patented Sept. 20, 1910.

Application filed March 12, 1910. Serial No. 548,876.

*To all whom it may concern:*

Be it known that I, JOHN J. CHALOUX, a citizen of the United States, residing at Watervliet, in the county of Albany and State of New York, have invented new and useful Improvements in Glass-Tube-Grinding Machines, of which the following is a specification.

This invention relates to a machine for grinding glass tubes used for spirit level vials, and the invention has for one of its objects to improve and simplify the construction and operation of machines of this character so as to be comparatively simple and inexpensive to manufacture, reliable and efficient in use and so designed that it can grind a large number of tubes simultaneously.

Another object of the invention is the provision of an improved means for reciprocating the tube holding chucks on the grinding elements.

Another object is the employment, in connection with the said reciprocating means for the chucks, of means for turning or partially turning the chucks or tubes held therein during the reciprocation thereof for insuring a uniform grinding action.

With these objects in view, and others as will appear as the description proceeds, the invention comprises the various novel features of construction and arrangement of parts which will be more fully described hereinafter and set forth with particularity in the claims appended hereto.

Figure 1:
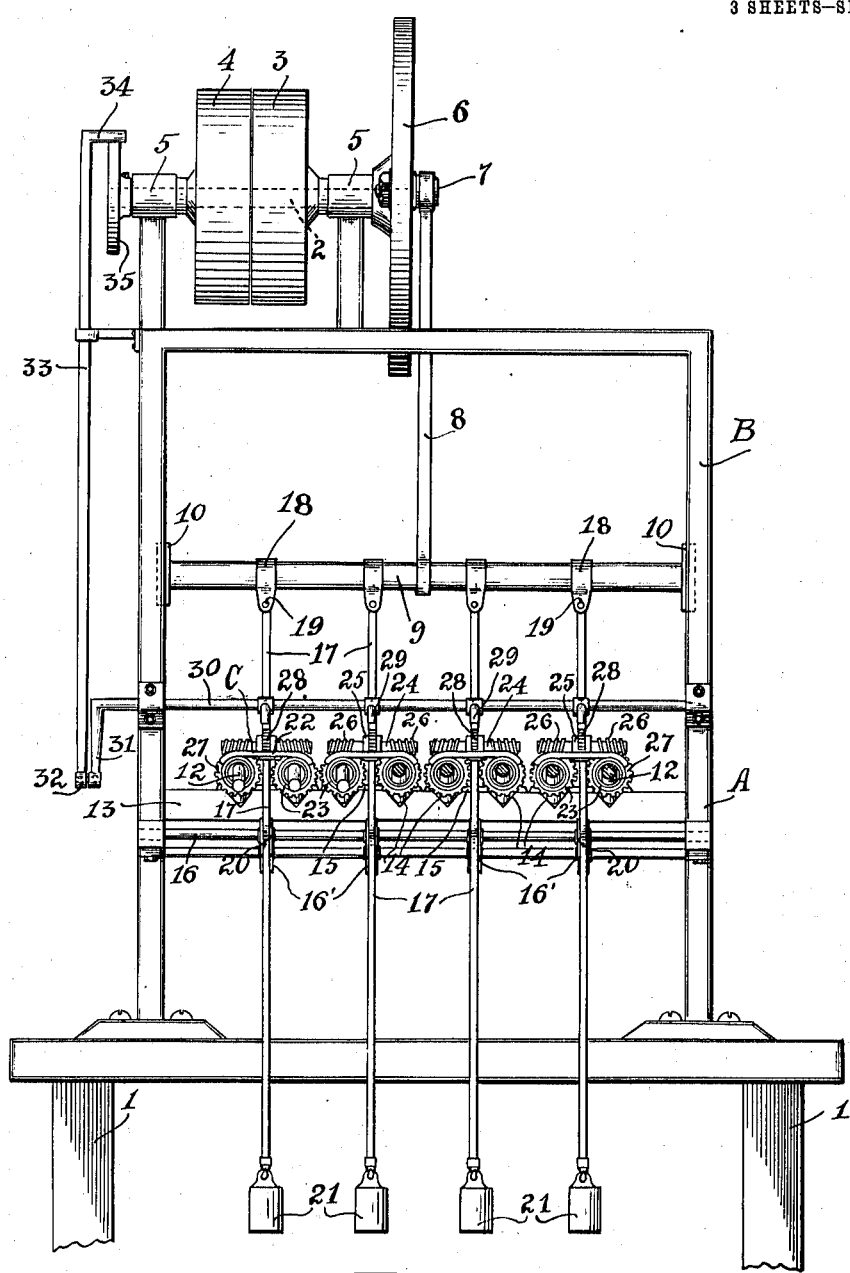
Figure 2:
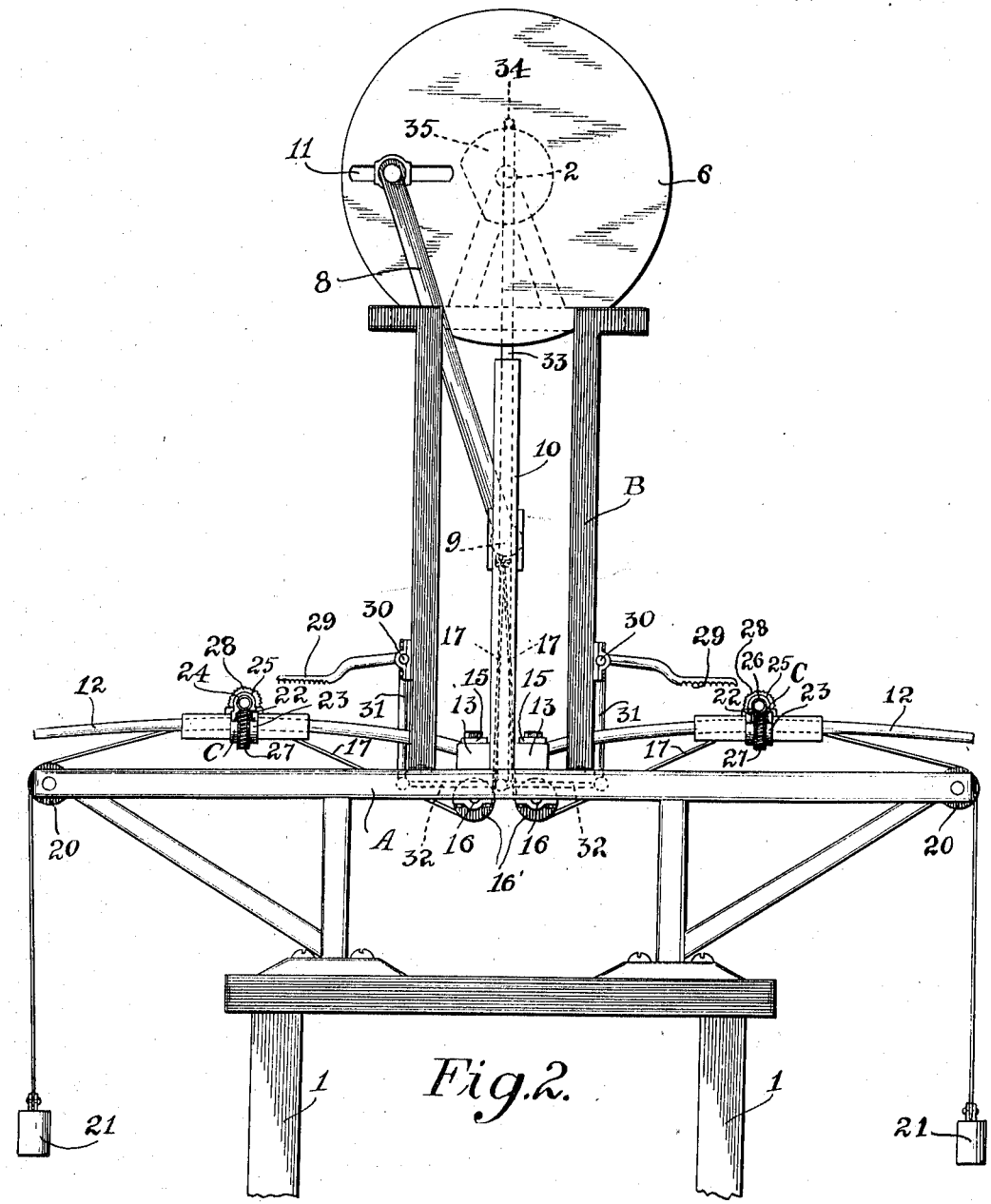
Figure 3:
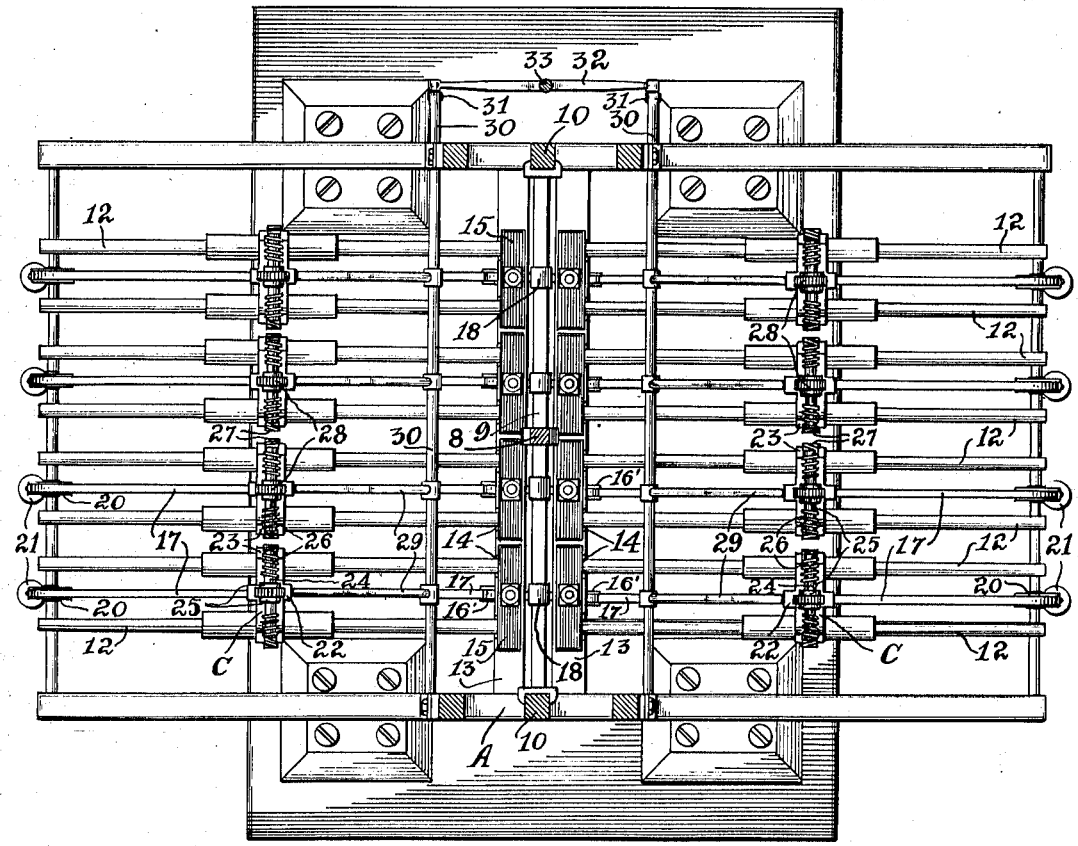
Figures 4, 5:
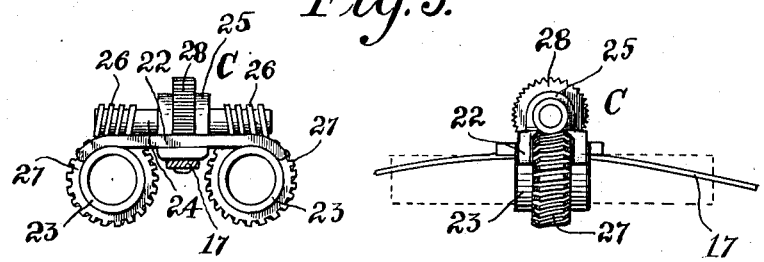
Figure 6:
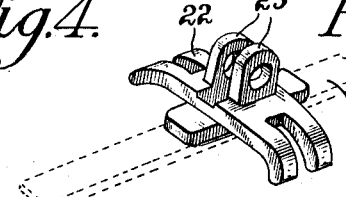

In the accompanying drawings which illustrate one embodiment of the invention:—Figure 1 is a front view of the machine. Fig. 2 is a side view thereof. Fig. 3 is a horizontal section of a portion of the machine. Fig. 4 is a detail view of one of the twin chucks looking at the end thereof. Fig. 5 is a side view of the chuck in Fig. 4. Fig. 6 is a perspective view of a chuck body.

Similar reference characters are employed to designate corresponding parts throughout the several views.

Referring to the drawing, A designates the frame of the machine which is mounted on a base structure 1 and is of any approved construction, there being a central upstanding secondary frame B on which is mounted a drive shaft 2 carrying loose and tight pulleys 3 and 4 so as to be driven by a belt, and on the shaft, which is journaled in bearings 5, is a disk 6 which has connected thereto by a crank pin 7 a pitman rod 8 that extends downwardly into the secondary frame B and is connected with a horizontal cross head 9. The cross head has its ends engaging vertical guide ways or standards 10 so as to reciprocate as the crank disk 6 rotates, the strokes of the cross head being adjustable as to length by the crank pin 7 being adjustable in a radial slot 11 in the crank disk 6.

The cross head actuates the tube holding chucks designated generally by C which reciprocates longitudinally of the curved grinding elements or bars 12. In the present instance two sets of bars or elements 12 are employed, there being eight in each set and the inner ends of these elements are secured to supporting bars 13 extending transversely of and secured to the frame A and these bars are formed with seats 14 which receive the inner ends of the grinding elements, which ends are clamped to their seats by plates 15 bolted to the supporting bars 13, and the outer ends of the elements 12 are unsupported. Under the bars 13 are horizontal shafts 16 which each have four pulleys, and passing around the pulleys 16' are flexible elements 17 which have their inner ends extending upwardly to and connected with the cross head 9, the connection with the cross head being effected by a collar 18 provided with a lug 19 to which the corresponding belts of both sets of chucks are connected. The flexible elements extend outwardly from the guide pulleys and connect each with a chuck C and they continue outwardly to the ends of the frame A where they pass over guide pulleys 20 and each flexible element has on its outer end a weight 21. Since the elements 17 are flexible it is obvious that they can be moved only in one direction by the cross head 9 and hence the weight 21 or equivalent devices must be employed for effecting the return movement of the chucks.

Each chuck consists of a suitably shaped body 22 which is secured to its individual elements 17 and movable with the said body is a pair of rotary tube holders 23 that slide back and forth on the bars or elements 12 so that each chuck will hold two tubes. On the body 22 is a rotary shaft 24 journaled in bearings 25 and this shaft has right and left end worm threads 26 at opposite ends which mesh with worm teeth 27 on the rotary holders 23 and on the shaft is a central spur wheel whereby the shaft will be turned step by step in a manner hereafter to be described so that the tubes will be given a rotary movement as they reciprocate on the grinding elements 12. Extending from opposite sides of the frame B are swinging racks 29, each disposed in the path of the spur gear 28 of the chuck so that during a certain portion of the movement of the chuck the spur gear will be turned and as a consequence the tubes supported in the chuck will each be given a partial turn to present a new surface to the grinding elements 12 operating thereon. Each set of racks 29 are mounted on a rock shaft 30 which has at its rear end a depending crank arm 31 that is connected by a link 32 with a reciprocating bar 33 the upper end of which terminates in a finger 34 which rides on a cam 35 secured to the drive shaft 2. When the rod 33 is raised by the cam the racks 29 are all thrown downwardly into the path of the respective gears 28 on the chucks so as to engage the said gears during the last part of the inward movement of the chuck. As soon as the gears 28 pass to the inner ends of the racks 29 the cam will permit the rod 33 to drop by its own weight and thus raise the rack bars from the gears 28 to permit the chucks to move outwardly without the tubes being turned back to their former positions.

After the tubes are inserted in the chucks and applied to the grinding elements the machine is ready to operate and the power is thrown on the shaft 2 which by its rotation will cause the cross head 9 to reciprocate. During the upward movement of the cross head an inward draft is produced on the flexible elements 17 so as to move all the chucks inwardly. At the last part of the inward movement the tubes in the chucks will be given a partial turn by the racks 29 being thrown into the path of the gears 28 in the manner before described. Preparatory to the outward movement the racks 29 are raised and the weights 21 now come into play to move the chucks outwardly and the cross head moves downwardly so that it is by the alternate action of the cross head and weights that the chucks or tube holding devices are reciprocated.

From the foregoing description taken in connection with the accompanying drawing, the advantages of the construction and of the method of operation will be readily apparent to those skilled in the art to which the invention relates, and while I have described the principle of operation of the invention, together with the device which I now consider to be the best embodiment thereof, I desire to have it understood that the device shown is merely illustrative and that such changes may be made when desired as are within the scope of the claims.

What I claim as new and desire to secure by Letters-Patent is:—

1. A machine of the class described comprising a plurality of grinding elements arranged side by side, a chuck movable longitudinally of the elements for supporting a plurality of tubes, and a flexible element connected with the chuck for reciprocating the same.

2. A machine of the class described comprising a plurality of grinding elements, a reciprocatory tube holder mounted thereon and including means for holding a tube on each element, a mechanism for reciprocating the holder, and means for turning the tubes on their respective grinding elements when the holder reaches a predetermined position.

3. A machine of the class described comprising a grinding member, a tube holder movable thereon, a flexible element connected with the holder, a reciprocatory device connected with the holder for moving the same in one direction, and a device operating in opposition to the first mentioned device for moving the holder in the opposite direction.

4. A machine of the class described comprising a grinding member, a reciprocatory holder movable thereon, a flexible element connected with and having portions extending in opposite directions from the holder, a weight connected with one end of the element, and a device connected with the opposite end of the element for coöperating with the weight to reciprocate the holder.

5. A machine of the class described comprising a plurality of grinding elements disposed approximately horizontally, a tube holder mounted to support tubes on the elements to move longitudinally thereof, a yielding means operatively connected with each holder for moving the same in one direction, flexible elements connected with the holders, a reciprocatory cross head connected with all the elements to move the holders in the opposite direction, a crank element, a pitman connected with the cross head, and means for adjustably connecting the pitman with the crank element.

6. The combination of a grinding element, a tube holding chuck movable thereon, an actuator having an adjustable stroke, means for connecting the actuator with the chuck for moving the same in one direction and a separate actuator connected with the chuck for moving the same in the opposite direction.

7. The combination of a grinding element, a tube holding chuck mounted for reciprocation thereon, a reciprocatory actuator having an adjustable stroke, a flexible element connected with the actuator and to the chuck, means for guiding the flexible element, and a device coöperating with the actuator for reciprocating the chuck.

8. The combination of a grinding element, a tube holding chuck mounted for reciprocation thereon, a reciprocatory actuator having an adjustable stroke, a flexible element connected with the actuator and to the chuck, means for guiding the flexible element, a weight coöperating with the actuator to reciprocate the chuck, and means for operatively connecting the weight with the chuck to be raised as the latter is moved by the actuator.

9. A machine of the class described comprising oppositely disposed grinding elements, a chuck mounted on each element, and separate coacting devices for moving the chucks simultaneously inwardly or outwardly.

10. A machine of the class described comprising oppositely disposed grinding elements, tube holding chucks movable thereon, and a common actuator for the chucks.

11. A machine of the class described comprising oppositely disposed grinding elements, tube holding chucks movable thereon, a reciprocatory actuator, flexible connections between the actuator and each chuck for moving the latter in one direction, and a device connected with each chuck for moving the same in the opposite direction.

12. A machine of the class described comprising approximately horizontally disposed grinding elements, tube carrying chucks movable thereon, a reciprocatory cross head, flexible elements connected with the cross head and each connected with a chuck, means for guiding the flexible elements, and weights flexibly connected with the chucks for maintaining the flexible elements taut and moving the chucks in the direction opposite to that in which they are moved by the cross head.

13. A machine of the class described comprising a plurality of sets of oppositely disposed grinding elements, chucks movable on the elements, a plurality of flexible members connected with the chucks, a common cross head to which all the members are connected for moving the chucks simultaneously inwardly, and a weight connected with each member, whereby the chucks simultaneously move outwardly during the reverse movement of the cross head.

14. A machine of the class described comprising a plurality of chucks including rotary tube holders, means for reciprocating the chucks, and a mechanism for turning the tube holders at a predetermined point in the movement of chucks.

15. A machine of the class described comprising a plurality of chucks each having a rotary tube holder, means mounted on each chuck for rotating the tube holder thereof, and devices movable periodically into and out of the path of the said means to simultaneously turn the holders of all the chucks.

16. A machine of the class described comprising a reciprocatory tube holding chuck including means for rotatably supporting the tube, and a device located in the path of the said means for imparting movement thereto.

17. A machine of the class described comprising a plurality of chucks each having means for rotatably supporting a tube, means for simultaneously reciprocating the chucks, a rock shaft, means for periodically rocking the shaft, and devices movable into and out of the path of movement of the chucks for imparting movement to the tube holding means thereof.

18. A machine of the class described comprising separate sets of inwardly and outwardly movable chucks, means on each chuck for rotatably supporting an article to be ground, devices movable into engagement with the said means of the chucks for turning the articles adjacent the end of one stroke of each chuck, and means for simultaneously throwing the devices into and out of operation.

19. A machine of the class described, a reciprocatory chuck including a rotary tube holder and worm gearing for turning the holder, and means mounted to move into and out of the path of the chuck and operating periodically through the gearing to turn the holder step by step.

In testimony whereof I affix my signature in presence of two witnesses.

JOHN J. CHALOUX.

Witnesses:
JENNIE CHALOUX,
HAVELOCK CHALOU.